United States Patent

Shay

[11] 4,203,750
[45] May 20, 1980

[54] MANUFACTURE OF FLAT GLASS
[75] Inventor: George C. Shay, Corning, N.Y.
[73] Assignee: Corning Glass Works, Corning, N.Y.
[21] Appl. No.: 27,522
[22] Filed: Apr. 5, 1979
[51] Int. Cl.² ........................................... C03B 18/02
[52] U.S. Cl. .................................. 65/99 A; 65/199;
65/200; 65/182 R; 65/324
[58] Field of Search ............... 65/99 A, 199, 200, 324, 65/182 R

[56] References Cited

U.S. PATENT DOCUMENTS

| | | | |
|---|---|---|---|
| 1,829,641 | 10/1931 | Ferngren | 65/199 X |
| 3,338,696 | 8/1967 | Dockerty | 65/324 X |
| 3,451,798 | 6/1969 | Simon | 65/199 |
| 3,479,171 | 11/1969 | Robinson et al. | 65/99 A |
| 3,622,298 | 11/1971 | Machlan et al. | 65/199 X |
| 3,770,406 | 11/1973 | Robinson et al. | 65/99 A X |

Primary Examiner—Arthur D. Kellogg
Attorney, Agent, or Firm—Burton R. Turner; John P. DeLuca

[57] ABSTRACT

A sheet of molten glass issuing from an overflow channel is supplied to the molten metal bath used in the formation of float glass. The overflow channel is positioned adjacent one end of such bath transversely of the longitudinal extent thereof, and the overflow channel is fed at one end thereof with homogeneous glass which has been thoroughly stirred and homogenized within a forehearth immediately adjacent the inlet end of such overflow channel, so that the resulting sheet may be attenuated without detrimental surface streak or ridges due to internal striae or cord which detrimentally affect the optical quality of the sheet.

10 Claims, 3 Drawing Figures

MANUFACTURE OF FLAT GLASS

BACKGROUND OF THE INVENTION

The invention relates to the manufacture of sheet or flat glass by means of the float glass process, and more particularly to the delivery of homogeneous glass in molten sheet form to the molten metal bath of the float process.

As shown by U.S. Pat. Nos. 3,083,551 and 3,884,665, the float process is typically characterized by the delivery of a sheet of molten glass onto the surface of a bath of molten metal such as tin, wherein the glass is normally delivered from the broad surface of a continuous glass tank over a refractory lip and onto the central one third or one half of the width of the molten bath. The ribbon of molten glass flows outwardly upon the molten bath until the force tending to cause the spreading, represented by the thickness and density of the glass, and the force resisting the spreading, represented by the surface tension and the radius of curvature of the glass edge, have reached an equilibrium. However, the theoretical thickness of the glass at such equilibrium is about 0.28", which is much thicker than required for normal architectural window glass and automobile windows. Accordingly, in order to produce the required thinner sheet, edge portions of the expanded sheet flowing outwardly on the molten bath are engaged by knurled rollers and the velocity of the sheet downstream from such rollers is increased to draw down and produce thinner sheet as shown by U.S. Pat. No. 3,853,523.

However, unless the glass which is supplied to the molten bath has been well stirred so as to be completely homogeneous and free of cord, surface streak or ridges may appear in the drawn glass as a result of the attenuation of nonhomogeneous glass containing cord or striae. That is, since surface streak or ridges are produced by the attenuation of discontinuities or glassy inclusions possessing optical and other properties different from those of the surrounding glass, it is imperative that the sheet of molten glass delivered to the surface of the tin bath be well stirred and homogeneous so as to avoid the formation of surface streak during the drawing down and attenuation of the sheet or ribbon delivered to the surface of the molten metal bath. In view of the fact that the surface defect becomes more pronounced as the glass on the molten bath is drawn thinner, homogeneity of the supply glass is even more important when producing thin glass sheets.

Various methods of delivering a sheet of molten glass to the molten metal bath have been suggested in addition to the conventional over-the-lip delivery as disclosed in the aforesaid U.S. Pat. Nos. 3,083,551 and 3,884,665, such as those shown by U.S. Pat. No. 3,679,389. All of such deliveries, however, include extended longitudinal flows having a width equal to the width of the delivered sheet, and accordingly such deliveries necessitate massive free surface areas. However, due to surface volatilization and temperature differentials between the surface and the depths therebelow, composition discontinuities and nonhomogeneous glass result which detrimentally affect the optical quality of the sheet glass formed therefrom due to the inclusion of cord and striae.

It thus has been an object of the present invention to improve upon the known technology of forming float glass by delivering well stirred homogeneous molten glass in sheet form to the molten metal bath of the float glass process to provide improved optical quality in the flat glass formed thereby.

SUMMARY OF THE INVENTION

In its very simplest form the present invention relates to the delivery of a sheet of homogeneous molten glass onto the surface of a bath of molten metal. Molten glass is delivered through a conventional narrow forehearth wherein it is well stirred, and homogeneous glass is delivered therefrom to the inlet end of a sheet forming overflow trough device. The trough is positioned above and extends laterally across an inlet end of a molten metal bath, for receiving a sheet of molten glass to be drawn therealong in the production of float glass. A sheet forming overflow trough device which may be utilized for delivering the molten sheet to the surface of the metal bath is shown in U.S. Pat. No. 3,338,696, wherein molten glass, which is delivered to the inlet end of an overflow channel, wells up and evenly overflows both sides in molten sheet-like paths which converge at the bottom of the forming member into a molten sheet. In view of the fact that the molten glass delivered to the overflow channel is homogeneous, having been thoroughly stirred immediately prior to delivery to the overflow channel, and further in view of the fact that the only free surface which the glass is exposed to is in fact the outer surface of the drawn sheet, it is possible to deliver a sheet of molten glass to the molten metal bath of the float process with improved optical qualities through the virtual elimination of cord and striae.

DESCRIPTION OF THE PREFERRED EMBODIMENTS

Figure 1:
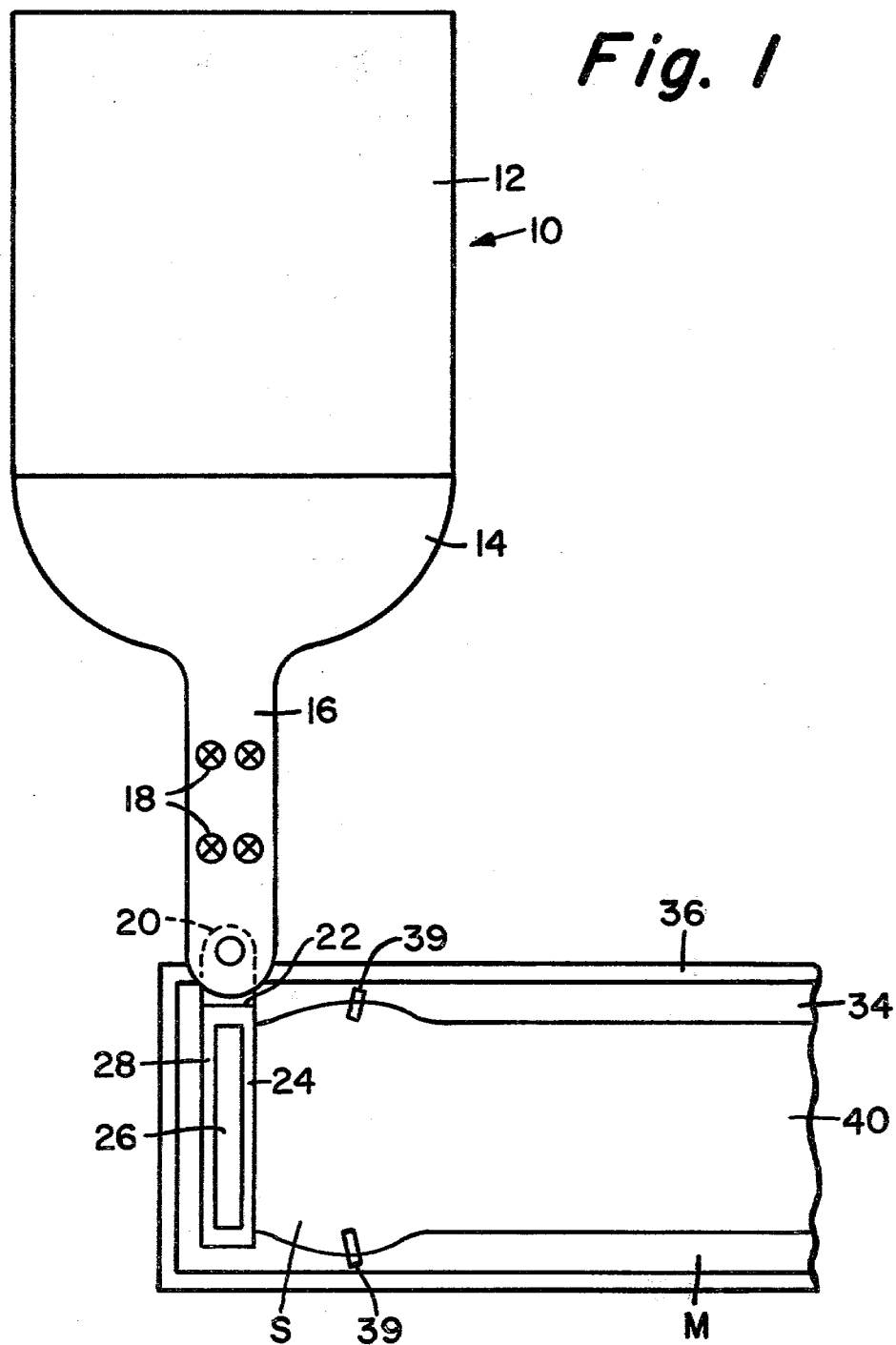
FIG. 1 is a somewhat schematic top plan view of the glass delivery system of the present invention.
Figure 2:
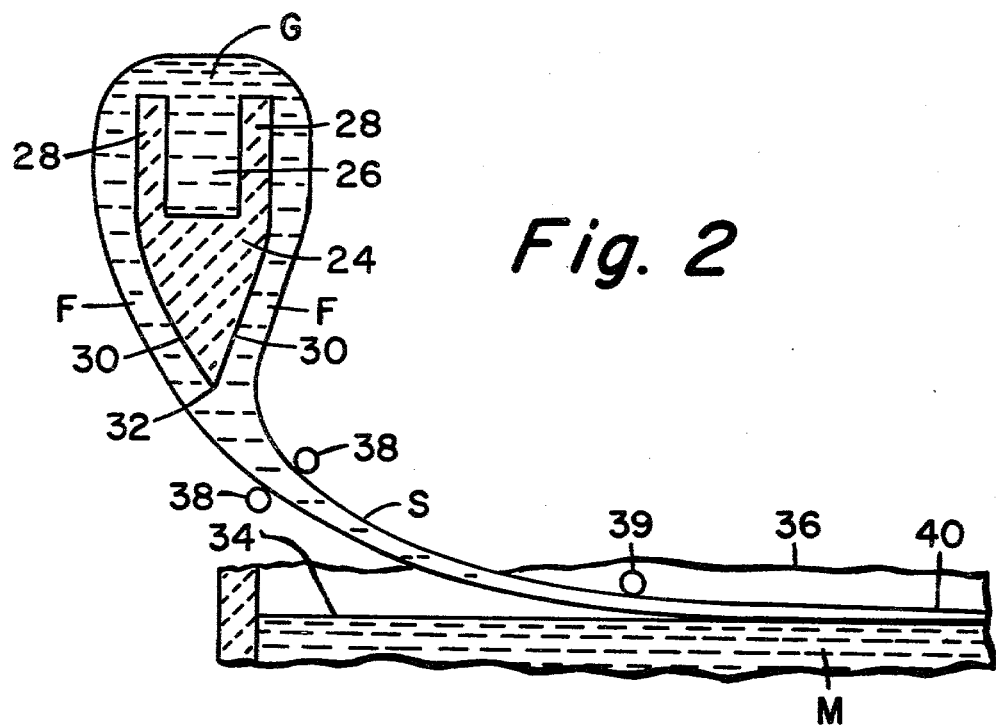
FIG. 2 is a somewhat schematic elevational view partially in section illustrating the overflow delivery of FIG. 1.

Referring now to FIGS. 1 and 2, a conventional melting tank 10 is shown having a melting zone 12 and a fining zone 14. The finer 14 is connected to a conventional narrow forehearth 16 having a plurality of stirrers 18 therein. The outlet end of the forehearth 16 has a feeder 20 connected to the inlet end 22 of a sheet forming overflow distributor trough member or feed device 24 such as disclosed in U.S. Pat. No. 3,338,696. Although the melting tank 10 is shown positioned transversely of float tank 36, it may be positioned longitudinally thereof if desired, such as is common in float glass operations. As shown also in FIG. 2, the overflow device 24 has a channel 26 bounded by sidewalls 28 over which the molten glass G overflows and forms two opposed sheet-like flows F downwardly along converging surfaces 30 of the sheet forming device 24. The converging flows F unite at a bottom root or draw line portion 32 of the sheet forming device 24 into a single sheet of molten glass S which is delivered to the surface 34 of molten metal M, such as tin, retained within a standard float tank 36. The sheet S of molten glass drawn from the root 32 of the forming device 24 may be provided with edge rollers 38 to slightly attenuate the sheet before depositing the same upon the surface 36 of the molten metal M so as to deposit the sheet thereon with a width virtually commensurate with that of the width of the molten bath, or in the alternative, a thicker sheet S could be deposited which would flow outwardly toward the edges of the bath as shown in FIG. 1. In either case, knurled rollers 39 engage the sheet S, and a conventional pulling device is employed at a downstream location and varied in the speed so as to provide the desired attenuation and thickness reduction in the ribbon of flat glass 40 produced by the float process.

Figure 3:
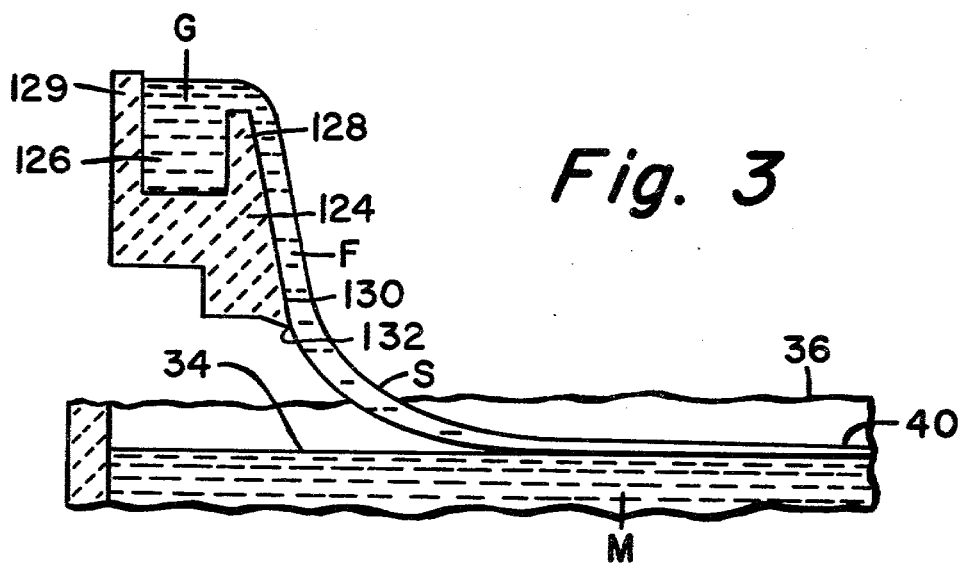
FIG. 3 is a somewhat schematic elevational view partially in section of a further embodiment of an overflow delivery which may be incorporated in the delivery system of FIG. 1.

Referring now to FIG. 3, a further preferred embodiment of the overflow distributor member or feed device 124 is shown having a longitudinally extending feed channel 126 bounded by a forward overflow wall 128 and a rearward back wall 129. The molten glass G overflows the upper weir surface of the forward sidewall 128 and flows downwardly in sheet form F along forming surface 130 to root portion 132 where it is drawn into a sheet of molten glass S and delivered to the surface 34 of a bath of molten metal M within a float tank 36 of a standard float process, from where it is drawn by conventional means into a flat ribbon 40. The overflow distributor or feeding device 124 has the advantage, over the overflow trough device 24, of being easier to support in view of the fact that the molten glass flows only over one surface. Further, since there is only one flow over the forming surface, less glass is lost to bead trim and the trim occasioned by the edge rollers. Although the undersurface of the flow F along forming surface 130 will not be a virgin surface of optical quality as is the outer surface of such flow, such under-surface will achieve such quality as it moves along the surface 34 of the molten tin bath M in float tank 36.

In view of the fact that the sheet glass delivered by distributor 20 or 24 is uniform across its width, it is possible to process higher flow rates on a given tin bath since less time or length of the bath would be required to smooth out flow variations relative to that required with present delivery systems. Further, due to the fact that less smoothing is required, the sheet glass from the distributor could be delivered at a lower temperature and resulting higher viscosity, thus reducing detrimental chemical reactions between the glass ribbon and the molten tin bath of the float process. Also, as previously mentioned, by using the overflow distributor of the present invention, it is possible to deliver sheet glass to the molten tin bath with a thickness which is less than the equilibrium thickness now deliverable thereto. Accordingly, the amount of attenuation required on the tin bath would be minimized, thus producing flat glass with improved optical quality.

Although the operation of the apparatus is fairly obvious from the description, batch material of a desired composition is melted and fined in a standard continuous tank and delivered to a conventional narrow forehearth having a plurality of stirrers therein, such as shown in U.S. Pat. No. 3,057,175, for thoroughly stirring and providing homogeneous glass at the outlet end thereof. Such homogeneous glass is then delivered to the inlet end of an overflow trough, such as shown in U.S. Pat. No. 3,338,696, positioned above and transversely across an inlet end of a float tank containing a bath of molten tin. The molten glass overflows the delivery trough and is delivered in molten sheet form, of virtually the same width as that of the tin bath, to the surface of such tin bath with a thickness of about 0.27". Knurled rollers maintain the width of such delivered sheet and a necessary pull rate to obtain the desired thickness, while standard withdrawal or traction rollers are applied to the sheet adjacent the removal end of the molten bath and operated at a speed so as to provide a three to one reduction. Thus, a flat ribbon with a thickness of about 0.09" of optical quality is produced, due to the thorough stirring and reduction of free surface area prior to delivery to the overflow member.

The end feed to the distributor of the present invention provides for much improved flow control over that of the lip feed used in the prior art. Typically, a round tube conveys the homogeneous stirred glass from a forehearth bowl to the inlet end of the overflow distributor. Thermal control of such tube is obtainable so as to yield flow control within about 1%. Also, by utilizing a needle-type controller within the bowl, the geometric impedance to glass flow may be varied.

Although the now preferred embodiments of the invention have been disclosed, it will be appreciated that various changes and modifications may be made thereto without departing from the spirit and scope thereof as defined in the appended claims.

I claim:

1. A method of delivering a sheet of substantially homogeneous molten glass to the surface of a bath of molten metal for producing float glass which comprises, delivering molten glass to a relatively narrow conditioning channel, flowing said molten glass longitudinally through said channel while simultaneously stirring such glass and producing a substantially homogeneous glass consistency, delivering said stirred and homogeneous glass to the inlet end of an overflow channel having opposed sidewalls, flowing such glass longitudinally along such channel and simultaneously overflowing at least one of said sidewalls and forming a downward flowing sheet-like flow of molten glass, and depositing said sheet of substantially homogeneous molten glass on the surface of a bath of molten metal for forming a ribbon of float glass.

2. A method of delivering a sheet of substantially homogeneous molten glass to the surface of a bath of molten metal as defined in claim 1 including the step of moving said ribbon of glass longitudinally along said bath and attenuating said ribbon to reduce the thickness thereof.

3. A method of delivering a sheet of substantially homogeneous molten glass to the surface of a bath of molten metal as defined in claim 1 including the step of moving said ribbon longitudinally along the surface of said bath, and flowing said molten glass longitudinally along said overflow channel in a direction transversely to the direction of movement of said ribbon along the surface of said molten bath.

4. A method of delivering a sheet of substantially homogeneous molten glass to the surface of a bath of molten metal as defined in claim 1 including the steps of flowing said molten glass longitudinally through said conditioning channel with a flow path which is substantially narrower than the downwardly flowing sheet-like flow of molten glass delivered onto the surface of said bath of molten metal.

5. A method of delivering a sheet of substantially homogeneous molten glass to the surface of a bath of molten metal as defined in claim 1 including the steps of longitudinally moving such ribbon of glass along said molten bath, positioning a distributor member above and transversely across one end of said bath, delivering said stirred and homogeneous glass to an inlet end of said distributor member and overflowing said overflow channel to form a downwardly flowing sheet-like flow of molten glass along at least one surface of said distributor member, and depositing such sheet-like flow on the surface of said molten bath with the width of such sheet-like flow extending transversely of the longitudinal extent of such bath.

6. A method of delivering a sheet of substantially homogeneous molten glass to the surface of a bath of molten metal as defined in claim 5, including the step of downwardly flowing said sheet-like flow of molten glass with a width substantially equal to the width of the molten metal bath surface.

7. A method of delivering a sheet of substantially homogeneous molten glass to the surface of a bath of molten metal for producing float glass which comprises, providing a longitudinally extending bath of molten metal, positioning a distributor member above and transversely of said longitudinally extending bath of molten metal, stirring and homogenizing a flow of molten glass, delivering such substantially homogeneous molten glass to an inlet end of said distributor and flowing such homogeneous glass within said distributor transversely of said longitudinally extending molten metal bath, overflowing at least one sidewall of said distributor and downwardly flowing a sheet-like flow of substantially homogeneous molten glass, and depositing such sheet of molten glass on the surface of said longitudinally extending molten metal bath for longitudinal movement therealong.

8. A method of delivering a sheet of substantially homogeneous molten glass to the surface of a bath of molten metal as defined in claim 7 including the step of controlling the pull rate of the sheet-like flow of molten glass from said distributor and thereby control the thickness of molten sheet-like glass deposited upon said surface of molten metal.

9. A method of delivering a sheet of substantially homogeneous molten glass to the surface of a bath of molten metal as defined in claim 7 including the steps of overflowing opposed surfaces of said distributor member into a pair of downwardly flowing sheet-like flows and converging said sheet-like flows into a single sheet of molten glass and delivering such single sheet to the surface of the bath of molten metal.

10. Apparatus for forming float glass which comprises, means for retaining a longitudinally extending bath of molten metal, distributor means positioned above and transversely of said molten metal bath means, said distributor means having an inlet end positioned transversely of the longitudinal extent of said molten metal bath means, means for producing homogeneous molten glass, means for delivering said homogeneous molten glass directly from said homogeneous producing means to the inlet end of said distributor means, and channel means forming a part of said distributor means for flowing said homogeneous glass transversely of said longitudinally extending molten bath means and for overflowing a sheet of homogeneous molten glass for delivery to said molten bath means.

* * * * *